US010635508B1

(12) United States Patent
Allen

(10) Patent No.: US 10,635,508 B1
(45) Date of Patent: Apr. 28, 2020

(54) PROGRAMMATIC IMPLEMENTATIONS GENERATED BY RECORDING USER ACTIONS VIA AN EPHEMERAL USER ACCOUNT

(71) Applicant: Amazon Technologies, Inc., Seattle, WA (US)

(72) Inventor: Nicholas Alexander Allen, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 232 days.

(21) Appl. No.: 14/983,196

(22) Filed: Dec. 29, 2015

(51) Int. Cl.
*G06F 9/54* (2006.01)
*G06F 9/50* (2006.01)
*G06F 3/0484* (2013.01)

(52) U.S. Cl.
CPC .......... *G06F 9/543* (2013.01); *G06F 3/04847* (2013.01); *G06F 9/5011* (2013.01); *G06F 9/547* (2013.01)

(58) Field of Classification Search
CPC .... G06F 9/543; G06F 3/04847; G06F 9/5011; G06F 9/547
See application file for complete search history.

(56) References Cited

U.S. PATENT DOCUMENTS

| | | | |
|---|---|---|---|
| 7,380,235 B1 | 5/2008 | Fathalla | |
| 2003/0179244 A1* | 9/2003 | Erlingsson | G06F 9/4443 715/788 |
| 2005/0187930 A1 | 8/2005 | Subramanian et al. | |
| 2005/0278728 A1* | 12/2005 | Klementiev | G06F 9/45512 719/328 |
| 2009/0327211 A1* | 12/2009 | McCune | G06F 9/455 |
| 2015/0150142 A1 | 5/2015 | Austin et al. | |

* cited by examiner

*Primary Examiner* — Brian W Wathen
*Assistant Examiner* — Kimberly L Jordan
(74) *Attorney, Agent, or Firm* — Davis Wright Tremaine LLP

(57) ABSTRACT

Systems and methods for generating a programmatic implementation based on a set of recorded API calls. One example includes recording a set of user actions performed via a temporary second user account and generating a programmatic implementation based at least in part on the recorded user actions.

21 Claims, 9 Drawing Sheets

| Launch Instance | Connect | Actions ⌄ | | | | | | |
|---|---|---|---|---|---|---|---|---|
| 🔍 Filter by tags and attributes or search by keyword | | | | | | | 1 to 15 of 15 > >| | |
| ▼ | Name ▼ | Instance ID ▼ | Instance Type ▼ | Instance Zone ▼ | Instance State ▼ | Status Checks ▼ | Alar |
| ○ | Storage-Gateway | i-31e56118 | m3.medium | west-3 | ○ running | ⊘ 2/2 checks ... | None |
| ○ | | i-08f1ad3d | m1.xlarge | west-1 | ○ running | ⊘ 2/2 checks ... | None |
| ○ | | i-207d9717 | 11.micro | west-1 | ○ running | ⊘ 2/2 checks ... | None |
| ● | | i-baad0ab2 | m1.small | west-2 | ● stopped | | None |
| ○ | PhilipSGhstance | i-75e460bc | m3.medium | west-3 | ○ running | ⊘ 2/2 checks ... | None |
| ○ | | i-feead0cb | m1.xlarge | west-1 | ○ running | ⊘ 2/2 checks ... | None |
| ○ | RDS VPC3 Ink | i-22c9dc17 | 11.micro | west-2 | ○ running | ⊘ 2/2 checks ... | None |
| ○ | Rusty Cabr | i-22c9dc17 | m3.medium | west-2 | ● stopped | | |

● RECORDING — 202

Instance: ■ i-baad0ab2    Public DNS: -

| Description | Status Checks | Monitoring | Tags |

Instance ID    i-baad0ab2      Public DNS -
Instance state    stopped      Public IP -
Instance type    m1.stopped      Elastic IP -
Private DNS    -      Availability zone    us-west-2b
Private IPs    -      Security groups    Test-WebServerSecurity
                                                               Group-1KLAPZBYEK4E3. view
                                                               rules
Secondary private IPs    -      Scheduled events -
VPC ID    -      AMI ID    amzn-ami-

FIG. 2

# PROGRAMMATIC IMPLEMENTATIONS GENERATED BY RECORDING USER ACTIONS VIA AN EPHEMERAL USER ACCOUNT

CROSS REFERENCE TO RELATED APPLICATION

This application incorporates by reference for all purposes the full disclosure of co-pending U.S. patent application Ser. No. 14/983,223, filed concurrently herewith, entitled "PROGRAMATIC IMPLEMENTATIONS GENERATED FROM AN API CALL LOG."

BACKGROUND

Configuring and managing computing resources can be done in various suitable ways including a programmatic approach. For example, a user can write computer code or call computing services via low-level primitives of a computing language. However, such an approach often requires a sophisticated user who understands coding and the specific programming languages involved.

Another approach to configuring and managing computing resources can include a graphical management service, which allows users to perform various actions and configure computing resources via a graphical user interface such as a website or the like. Such an interface can simplify various actions to a click of button or other simple interaction, which makes it easier for users unsophisticated in programming and computers to configure and manage computing resources. However, graphical management services often fail to provide for advanced features such as automation, and users are then required to use a programmatic approach if they want access to advanced features.

BRIEF DESCRIPTION OF THE DRAWINGS

Various techniques will be described with reference to the drawings, in which:

FIG. 2 illustrates an example user interface where actions can be performed and recorded;

DETAILED DESCRIPTION

Figure 1:
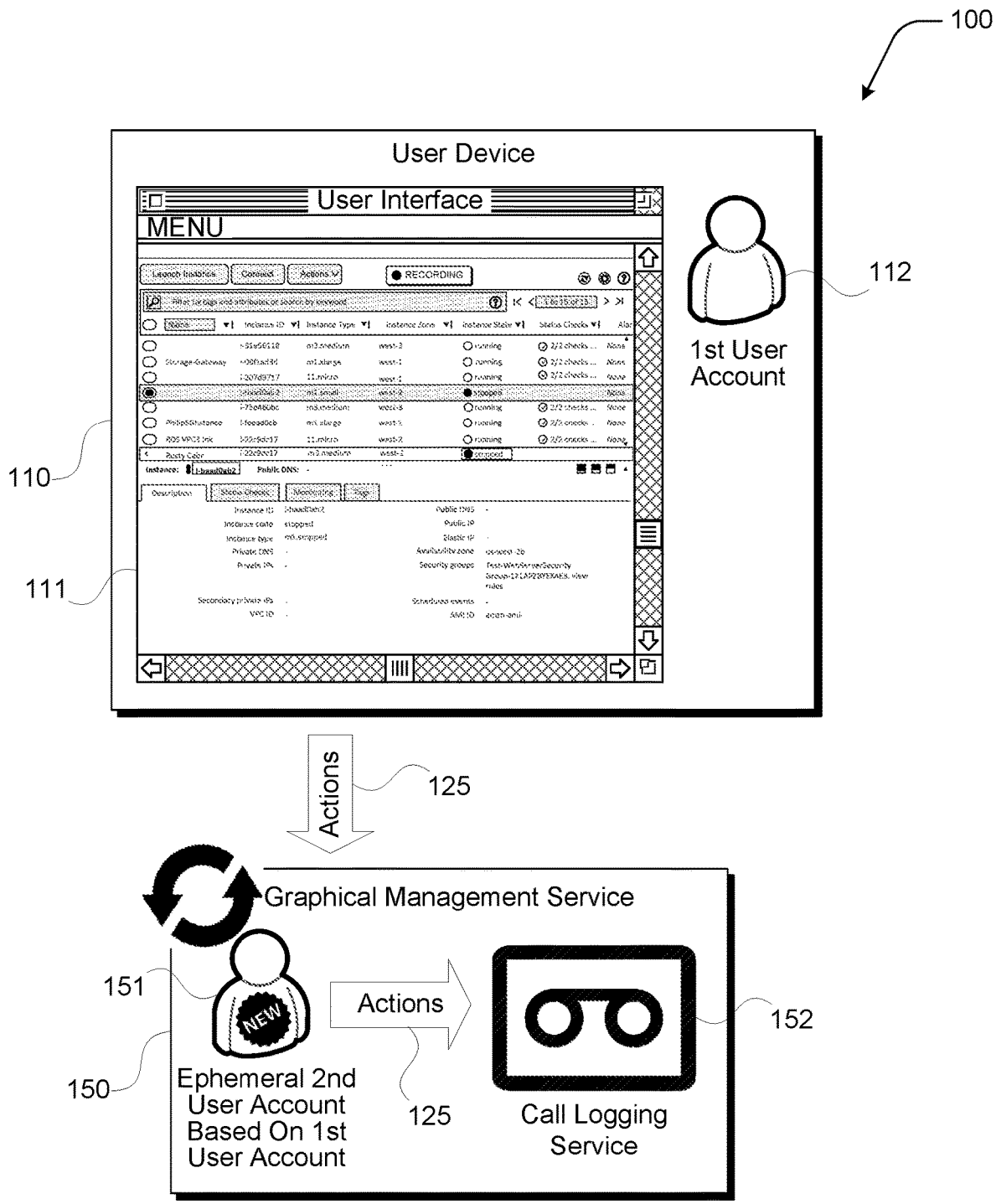
FIG. 1 illustrates an example operating environment having a user device and a graphical management service that is shown logging actions performed at the user device on a user interface.

The following disclosure describes techniques for generating a programmatic implementation by recording user actions performed via an ephemeral second user account and generating a programmatic implementation such as program text or executable program based on the recorded user actions.

In one example, a system for generating a programmatic implementation includes a graphical management service, a call logging service, and a program generator. The call logging service and program generator may or may not be a part of the graphical management service. A user device can interact with the graphical management service to generate a programmatic implementation based on a set of recorded actions performed in a user interface at the user device.

A method for generating a programmatic implementation can include a user device initiating an action recording session at a graphical management service with the user device logged-in with a first user account. In response, the graphical management service can provision an ephemeral second user account based on the first user account, which can have the same or fewer permissions than the first user account (e.g., a proper subset of account permissions held by the first account). The graphical management service can make a switch such that interaction with a user interface on behalf of the first user account results in application programming interface (API) calls being made on behalf of the second user account instead of the first user account. In some examples, the graphical management service can update a user account configuration and have the server obtain credentials for the second user account that the graphical management service can use temporarily during a recording session. Such a code, credentials, or the like associated with the second account may or may not be send to the user device.

Creating the second account and switching from the first user account to the second user account can be completely or partially obscured from the user, such that the user is not aware that the second temporary user account is being provisioned, used, and later de-provisioned. Also, the user device may not have access to the second user account or be able to configure the second user account.

Generating and using an ephemeral second user account that is based on the first user account, but has fewer permissions and/or a proper subset of account permissions, provides for a more desirable set of recorded user actions. For example, the first user account can be associated with background processes, operations, or actions that are unrelated to the actions that are the target of the action recording session. By generating an ephemeral second user account for the recording session, the recording of extraneous actions can be prevented, which can make it easier to generate a relevant programmatic implementation based on the recorded actions.

After receiving confirmation that the action recording session has been initiated, a user can perform a series of actions on a user interface at the user device, and data corresponding to these actions can be sent to the graphical management service and recorded. The user interface can include a webpage presented in a browser on the user device and actions performed on the webpage can be recorded and converted into a programmatic implementation for automation of the performed actions. Recording can relate to a wide variety of suitable actions, including the setup and management of virtual computing resources.

The user can record a set of actions during an action recording session and then terminate the action recording session. At the end of the action recording session, the graphical management service can disable recording of actions associated with the temporary second user account, delete the temporary second user account, and switch the user back to the first user account. For example the graphical management service can reinstate a set of permissions to the first user account that enables API calls to be made in connection with resources associated with the first user account instead of the second user account.

A programmatic implementation such as program text or an executable program can be generated based on the set of actions recorded during the action recording session. Generating a programmatic implementation can include filtering the set of recorded actions to remove extraneous or redundant actions and converting the filtered set of actions to a programmatic implementation that is operable to perform the set of filtered actions when executed, either as a stand-alone application or within a program.

In some examples, the graphical management service can determine an interval of time during which actions made on a user interface associated with a second temporary user account are made and obtain, from an API call log, a set of records that indicates a set of API calls made during the interval of time. The graphical management service can further generate a programmatic implementation that is usable to automate submission of the set of API calls such that the set of API calls are made independent of interaction with the user interface.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example operating environment 100 having a user device 110 and a graphical management service 150 that is shown logging actions 125 performed at the user device 110 on a user interface 111. The user device 110 may be a device, such as a device listed below in connection with FIG. 9. In this example, the user device 110 is illustrated presenting a user interface 111 and being logged-in via a first user account 112. Actions 125 are shown being communicated to the graphical management service 150, which comprises a call logging service 152.

In various examples, the call logging service 152 can comprise a program or device configured to record actions performed in the user interface 111, record Application Programming Interface (API) calls generated by interaction with a user interface, and/or parameters of API calls, and the like. Such user interface actions or API-related actions, and the like, can be generally referred to as actions in the context of the present disclosure.

As illustrated in FIG. 1, the graphical management service 150 can generate a new ephemeral second user account 151 based on the first user account 112 and switch the user from the first user account 112 to the second user account 151. While logged-in via the second user account 151, the actions 125 received from the user device 110 can be recorded via a call logging service 152.

Various examples generate a new and clean second account 151 for recording actions 125 performed in a user interface 111 because using such a second account 151 can generate a more desirable recording of actions 125 compared to using the first user account 112.

For example, the first user account 112 can be more "noisy." In other words, there can be various background processes associated with the first user account 112 that would be recorded as actions associated with the first user account 112, but that would not be relevant to the actions being performed in the user interface 111 that are the target of recording and subsequent generation of programmatic implementation data associated with the actions. As an example, during recording, other users and/or automated processes may make calls on behalf of the first user account 112 as part of the normal course of business. Accordingly, in various examples, the new second user account 151 can be generated based on the first user account 112, but can be provisioned with a limited set of permissions, capabilities, resources, or the like so that actions 125 performed in a user interface 111, while logged-in with the second user account 151, generates a more desirable recording of actions 125.

Additionally, although some examples relate to actions performed directly by a user at the user interface 111, in further examples, such actions can be performed by a user proxy, user interface proxy, an intermediary user, or the like. For example, the user interface 111 can cause a service or other program to take actions, and recorded action can be directed at such a service or program.

FIG. 2 illustrates an example user interface 200 where actions can be performed and recorded. In this example, the user interface 200 can comprise a console for managing resources via web services. Example resources include, but are not limited to, compute resources (e.g., physical and/or virtual computer systems), storage resources (e.g., physical and/or virtual disks, logical data containers, data objects, databases, database records, etc.), identities, policies, and/or other resources that may be offered by a computing resource service provider. Actions that can be recorded can include actions performable via an API call and include, configuring a virtual machine, launching a virtual machine, pausing a virtual machine, stopping a virtual machine, associating a virtual drive with virtual machine, de-coupling a virtual drive from a virtual machine, modifying availability parameters of a virtual machine, modifying access permissions of a virtual machine, capturing and storing a virtual machine image, saving data to an object level storage device, checking the state of a virtual machine, and the like. In this example, the user interface 200 can comprise a recording bottom 202 for initiating, pausing and/or stopping an action recording session.

Although the example of FIG. 2 relates to computing resources manageable via web services, further examples can relate to any suitable user interface. Some examples record actions related to non-virtual computing services, configuration of machinery, configuration of a software application, configuration of a webpage, configuration of a smartphone, configuration of an entertainment system, and the like. Additionally, in some examples, the user interface 200 may or may not be the same user interface 111 shown in FIG. 1.

Figure 3:
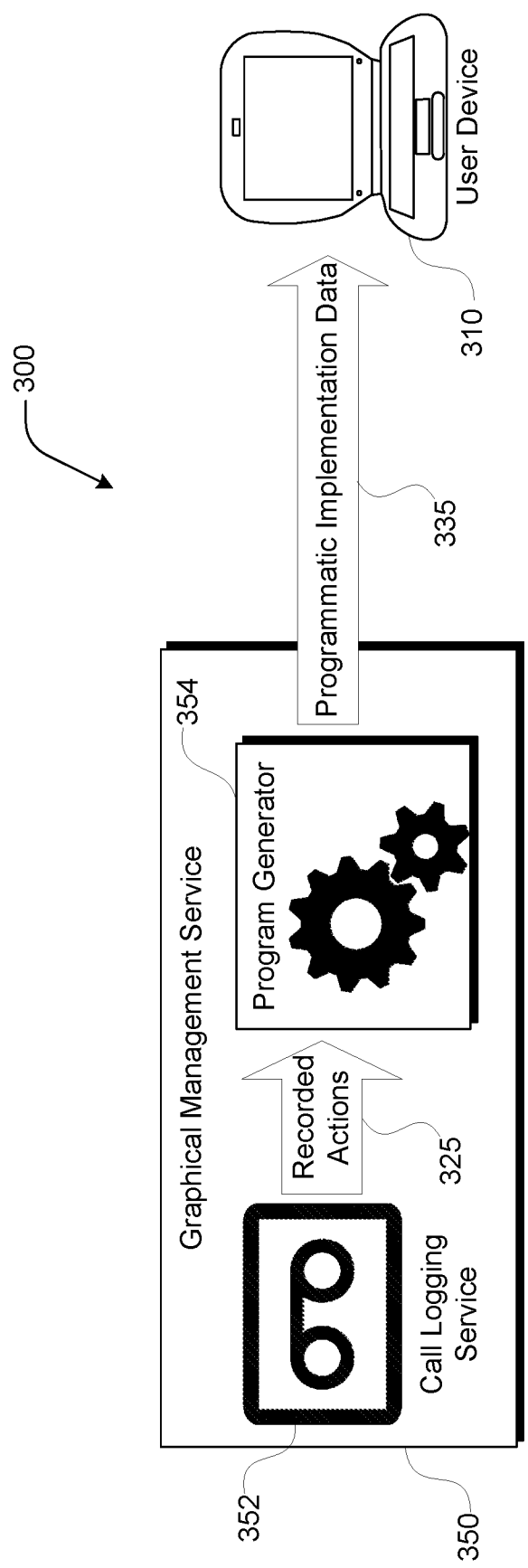
FIG. 3 illustrates an example operating environment having a graphical management service generating programmatic implementation data via a program generator based at least on recorded user actions.

FIG. 3 illustrates an example operating environment 300 having a graphical management service 350 generating programmatic implementation data 335 via a program generator 354 based on recorded user actions 325. As illustrated in this example, recorded actions 325 are communicated from a call logging service 352 to a program generator 354.

The program generator 354 generates programmatic implementation data 335, which is communicated to a user device 310.

In various examples, a program generator 354 can comprise a program or device that converts actions such as API calls, API call parameters or user interface actions to a programmatic implementation. In some examples, the program generator 354 can be part of or associated with the graphical management service 350, but in further examples the program generator 354 can be a separate program or device or located on a device that is separate from the graphical management service 350.

In various examples, the program generator 354 can receive a set of recorded actions 325 and convert these actions to programmatic implementation data 335, such as an executable program, program text, an excerpt or snippet of software code, a template for generating program text or an executable, or the like. In other words, a set of recorded actions 325 can be converted into programmatic implementation data 335 that is operable to reproduce, generate or mimic a portion of the actions of the set of recorded actions 325. For example, in some implementations, programmatic implementation data 335 can be generated corresponding to actions performed in a user interface. In some implementations, the programmatic implementation data 335 can implement a set of actions outside of the context of the user interface from which a set of actions were recorded. In other words, in some implementations, the programmatic implementation data 335 can implement actions without relying on specific fields, boxes or buttons within the specific user interface, or without reference to a position of a cursor or the like.

The programmatic implementation data 335 can be sent to the user device 310, where it can be used in various desirable ways. For example, where the programmatic implementation data 335 comprises an excerpt or snippet of software code, such software code can be inserted into a program, which can configure the program to implement a set of actions corresponding to a portion of the recorded actions 325. In another example, where the programmatic implementation data 335 comprises an executable program, the user can selectively execute the program or have the executable program called by another program to implement a set of actions corresponding to a portion of the recorded actions 325.

In various implementations, generating programmatic implementation data 335 from a set of recorded actions 325 cam facilitate automation of actions associated with the recorded actions 325. For example, in an implementation where recorded actions 325 relate to virtual computing, a user can record the setup, and management and/or termination of one or more virtual machines so that such configurations can be automated. Actions that can be recorded can include actions performable via an API call and include, configuring a virtual machine, launching a virtual machine from a template, launching a virtual machine from a snapshot, pausing a virtual machine, stopping a virtual machine, associating a virtual drive with virtual machine, coupling/de-coupling a virtual drive from a virtual machine, modifying availability parameters of a virtual machine, modifying access permissions of a virtual machine, capturing and storing a virtual machine image, saving data to an object level storage device, checking the state of a virtual machine, and the like. According, in various examples, setup, and management and/or termination of one or more virtual machines be implemented in a single step or can be called by another program.

In some examples, the graphical management service 300 may or may not be the same graphical management service 150 of FIG. 1. In some examples the call logging service 352 may or may not be the same call logging service 152 of FIG. 1. In some examples, the user device 310 may or may not be the same user device 150 of FIG. 1.

Figure 4:
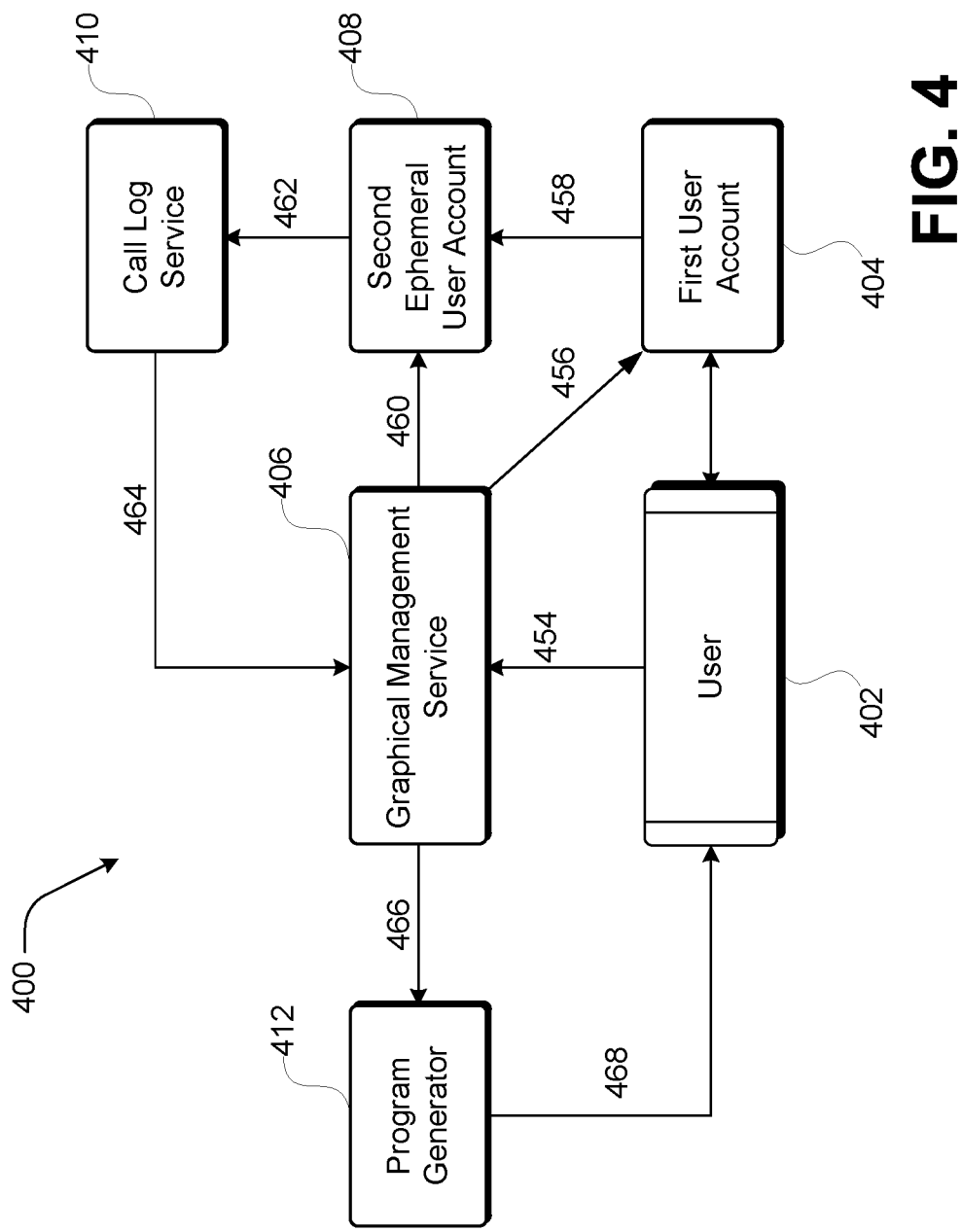
FIG. 4 is a block diagram illustrating an operating environment and example steps of a method for recording user actions and generating programmatic implementation data.

FIG. 4 is a block diagram illustrating an operating environment 400 and example steps of a method for recording user actions and generating programmatic implementation data. The operating environment 400 is shown comprising a user 402, a first user account 404, a graphical management service 406, a second ephemeral user account 408, a call log service 410, and a program generator 412. In various embodiments, the user 402 can comprise one or more human operator associated with any suitable user device, which can include a laptop computer, desktop computer, smartphone, gaming device, television set, tablet computer, wearable device, or the like. The user 402 can be a customer of a web services provider associated with one or more of the graphical management service 406, call log service 410, and/or program generator 412.

The first user account 404 can be an account associated with the user 402. In some examples, the user account can be associated with a services account of a web services provider and the user account can provide the use with access to setting up and managing various web services as discussed in more detail below. The first user account 404 can be associated with user profile data, which can include billing data, user biographical data, user permissions and the like.

As discussed, the second ephemeral user account 408 can be a temporary, transient or ephemeral user account that is provisioned temporarily for an action recording session as described in various examples of this disclosure. The second ephemeral account 408 can be similar to the first user account 404, but can be substantially stripped-down compared to the first user account 404. For example, where the second user account 408 is provisioned for the limited purpose of being associated with API calls, user actions, and the like that are to be recorded for programmatic implementation, the second user account 408 can have fewer permissions, capabilities, functionalities, or attributes compared to the first user account 404. Alternatively, second user account 408 can be provisioned with a proper subset of account permissions held by the first user account 404. For example, the second ephemeral user account may not have, billing information, user biographical data or the like. Additionally, the second user account may not be directly accessible by the user 402. For example the user 402 may not be aware of the existence of the second account and may not have access to, or be provided with, login credentials or other identifiers associated with the second account 408.

The call log service 410, graphical management service 406 and program generator 412 can comprise a program, device, or the like. The call log service 410, graphical management service 406 and program generator 412 may or may not be part of the same program or device, and may or may not be geographical proximate. In one example, the graphical management service 406 can comprise the call log service 410 and the program generator 412.

In the example of FIG. 4, a user 402 is associated with a first user account 404 that is associated with a first set of permissions. The user 402, through a computing device such as described below, can request 454 an action recording session at a graphical management service 406 while being logged-in under the first account 404. The graphical management service 406 uses 456 the first user account 404 to provision 458 a second ephemeral user account 408 that can be used for the action recording session. The second ephemeral user account 408 can be associated with a second set of privileges.

Some examples provision 458 an ephemeral user account 408 that can be used for the action recording session to generate a more suitable set of actions for recording. For example, there can be various types of activity occurring relative to the first user account which may not be within control of the user 404, including automated processes, and the like, which may or may not be obscured from the user 402. Such actions may not be relevant or associated with the one or more actions that are the target of the recording session and therefore some examples generate a set of actions for recording that does not include such extraneous or irrelevant actions that can be present associated with the first user account 404.

Accordingly, in some implementations, a second user account 408 can be temporarily generated that is not affected by extraneous or irrelevant actions aside from the target actions that the user 402 desires to record within a recording session. Additionally, the second user account 408 can provide for tagging of action data with identifiers that may not otherwise be present when the first user account 404 is being used. Such unique or non-unique tags can be used when generating programmatic implementation data.

In various implementations, the second permissions of the second user account 408 can be less than or equal to the first permissions of the first user account 404. In other words, in such implementations, the second user account 408 can have as many permissions or fewer permissions than the first user account 404, but may not have a greater set of permissions. Alternatively, second user account 408 can be provisioned with a proper subset of account permissions held by the first user account 404. For example, in some implementations the second user account 408 can be generated by copying the permissions of the first user account 404, which may include removal or exclusion of some permissions associated with the first user account 404.

Additionally, in some examples, generation of the second user account 408 can be completely or partially obscured from the user 402. For example, the user 402 may not be aware that a second user account 408 is being provisioned, used and/or de-provisioned. However, in some implementations, the user 402 can authorize the creation of the second user account 408, but the permissions and other properties of the account may be automatically generated outside of user control. Additionally, in further implementations, the user 402 may not have access to the second user account 408. For example, the user 402 may not be able to access, modify, delete, or otherwise modify characteristics of the second user account 408.

With the second user account 408 provisioned 458, the graphical management service 406 switches 460 the user 402 from the first user account 404 to the second user account 408. In various implementations, such a switch to the second user account 408 can be partially or completely obscured from the user 402. For example, identifiers indicating use under the first user account 404 may not change and including a user name or other identifier.

Additionally, in some examples, where responses are being "generated specific to the second user account 408 (e.g., by including an identifier specific to the second user account), or the like, such responses can be converted to being associated with the first account such that the user 402 appears to receive any notifications, alerts, or the like, on behalf of the first user account instead of the second user account. In other words, responses to the user 402 can be rewritten to be for the first user account 404 instead of the second user account 408 so that the second user account 408 can be obscured from the user 402.

A call logging service 410 is activated 462 and actions performed by the user 402 while logged-in via the second user account 408 are logged by the call log service 410. The call log service sends 464 a set of recorded action data to the graphical management service 406. Such sending 464 can occur in real time or can be batched.

When the user 402 ends the recording session, the call log service 410 can be disengaged, the second user account 408 can be de-provisioned, and the user 402 can be switched back to the first user account. The graphical management service 406 sends 466 recorded action data to a program generator 412, which generates programmatic implementation data and sends 468 the programmatic implementation data to the user 402. The programmatic implementation data can correspond to one or more of the actions performed by the user 410 and recorded during a recording session. In various implementations, the programmatic implementation data can be provided 468 as an excerpt of code, program text, an executable program, a template, or the like.

In some examples, programmatic implementation data can correspond to high-level actions that are not relative to a specific user interface, or other operating environment. In other examples, programmatic implementation data can correspond to low-level user actions including position of a cursor, a click of a mouse, a button click on a keyboard, or the like.

In various implementations, generating programmatic implementation data can include filtering out actions that are not related to a set of actions that the user 402 desires to record. For example, if while recording a set of actions, the user 402 clicks on several tabs of a user interface in search of a desired configuration, it can be possible to filter out such searching actions if such actions are identified as being unrelated to actions that are desired as part of a programmatic implementation. Similarly, where automated processes such as accessing a storage location, auto-saving a file, or the like, are present in a set of recorded actions, it can be possible to filter out such actions if such actions are identified as being unrelated to actions that are desired as part of a programmatic implementation.

Filtering of actions and generation of filtered programmatic implementation data can be done in various suitable ways. For example, a set of recorded API calls can be filtered based on a set of filtering criteria to exclude and/or include certain API calls in a programmatic implementation. In some examples, actions can be white-listed and/or black-listed. In other words, certain actions can be tagged for inclusion in a programmatic implementation and other actions can be tagged for exclusion from programmatic implementations. In other examples, filtering can be based on a history of generated programmatic implementations by the user 402 and/or a plurality of system users.

In some examples, API calls such as initiation and termination of an action recording session (or other general interactions with the user interface that do not directly involve management of computing resources) may be included in a set of recorded API calls, but such API calls can be black-listed as irrelevant to a desired programmatic implementation. In further examples, filtering criteria can exclude query API calls and include mutating API calls. In other words, filtering criteria can be designed to include API calls that modify, configure, mutate or otherwise directly involve computing resources, but exclude API calls that that do not modify, configure, mutate or otherwise directly involve computing resources (e.g., requests that query the status of computing resources or involve metadata of computing resources such as account setup API calls, API calls that set permissions, and the like).

In some examples, the graphical management service 406 may or may not be the same graphical management service 150, 350 of FIGS. 1 and/or 3. In some examples, the call logging service 410 may or may not be the same call logging service 152, 352 of FIGS. 1 and/or 3. In some examples, the user 402 may or may not be, or be associated with, the same user device 150, 310 of FIGS. 1 and/or 3. In some examples, the program generator 412 may or may not be the same program generator 354 of FIG. 3.

Figure 5:
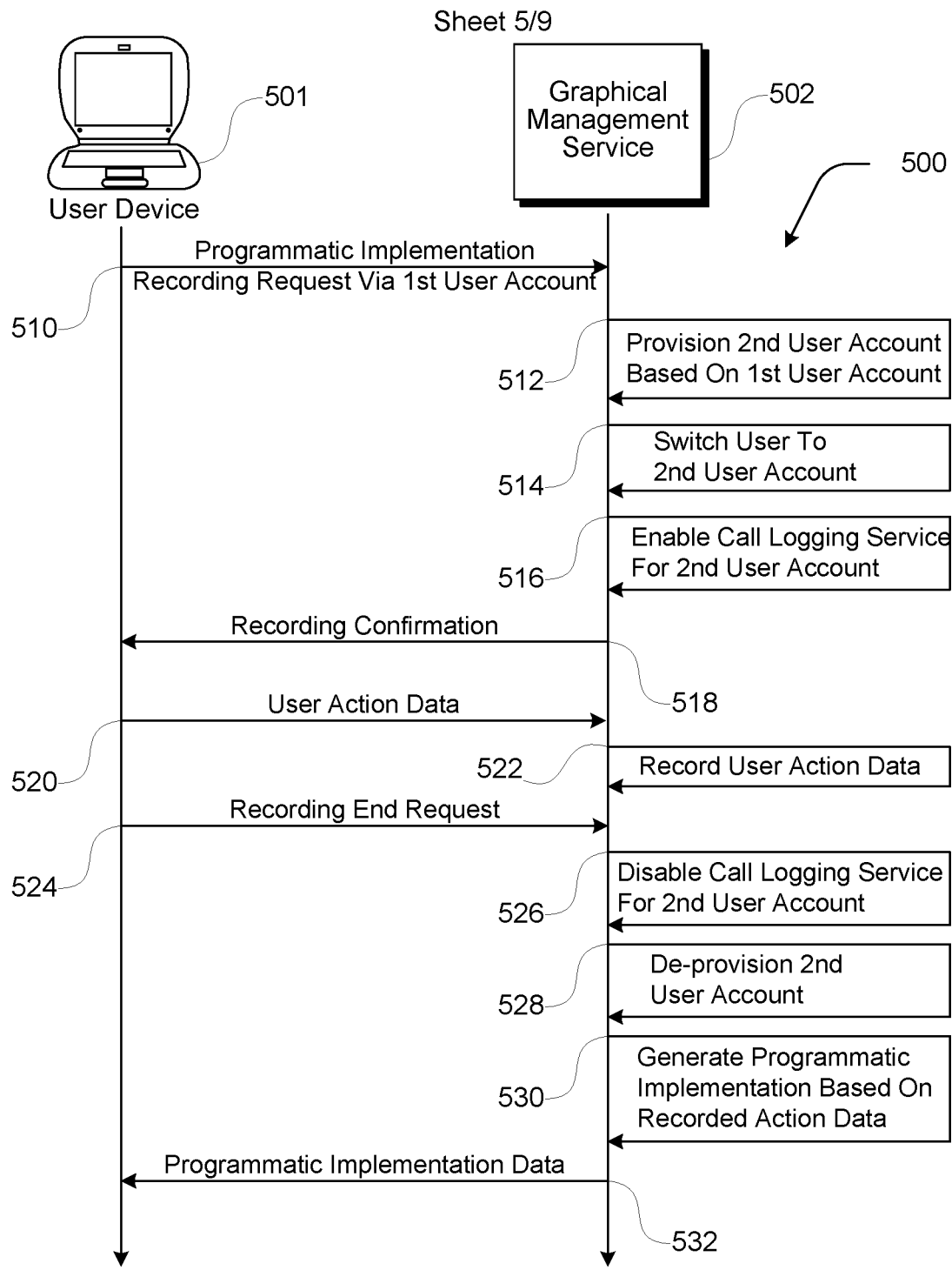
FIG. 5 illustrates a set of example communications between a user device and graphical management service for recording user actions and generating programmatic implementation data.

FIG. 5 illustrates a set of example communications 500 between a user device 510 and a graphical management service 502 for recording user actions and generating programmatic implementation data. The communications 500 begin where a programmatic implementation recording request is sent to the graphical management service 502 via a first user account.

The graphical management service 502 provisions 512 a second user account based on the first user account. As discussed, such provisioning 512 can be obscured from the user device 501 such that the user device 501 is not alerted or otherwise aware that a second user account is being provisioned 512. The graphical management service 502 switches 514 the user from the first user account to the second user account 516. As discussed, switching 514 the user to the second user account can be obscured from the user device 501 such that the user device 501 is not alerted or otherwise aware that the switch 514 has occurred.

As discussed, obscuring actions from a user and/or user device can occur in various suitable ways. For example, a user can use login credentials to login to the first user account via a user interface such as a webpage. The webpage can display an active user account, including an active user name, user account, or the like. However, when a second temporary user account is generated, the webpage may not display an indication that the second user account is being generated or that the user has or is being switch to a login user the second user account. In other words, the use may not need to provide permission or configure the second user account, and no indication of such generation or a switch may be provided on the webpage.

In one example, the graphical management service provisions the second account by making a call to an identity management service and a result of the call includes credentials that allow the graphical management service to make calls on behalf of the second temporary user account. As discussed, in some examples a user interface may not reflect such a change, but the code behind the API associated with the user interface makes calls using credentials provided for the second user account instead of the first user account.

A call logging service is enabled 516 for the second user account such that API calls or other actions performed at the user device 501 are logged or otherwise recorded. For example, as discussed, one implementation can include configuring a virtual computing system, and recorded calls can include various actions related to managing one or more virtual machine. In various examples, the call logging service can log calls associated with the second temporary user account, which can be queried for or automatically sent to a desired location as discussed.

A recording confirmation is sent 518 to the user device 501, which can confirm that the recording of actions at the user device 501 has been initiated. For example, in some implementations a user interface can display a symbol indicating that recording has begun (e.g., as shown in FIGS. 1 and 2).

User action data, including API calls and the like is sent 520 to the graphical management service 502 where the user action data is recorded 522. Although a single sending 518 and recording 522 of user action data is illustrated in this example, it should be clear that sending of a plurality of sets of user action data and recording of a plurality of sets of user action data can occur over any desired period of time. For example, a user action data recording session can last a number of seconds, minutes, hours, or the like.

To terminate the user action data recording session, in an example, the user device 501 sends 524 a recording end request to the graphical management service 502, where the call logging service for the second user account is disabled 526, the second user account is de-provisioned 528 and a programmatic implementation is generated 530 based on a portion of the recorded user actions. For example, where recorded user actions comprise API calls or API call parameters, generating 530 a programmatic implementation can comprise selecting or writing code that corresponds to the set of recorded API calls, API call parameters, or the like. In other words, recorded API calls or API call parameters can be converted into a programmatic implementation of a portion of the API calls and/or API call parameters. For example, a programmatic implementation can include executable instructions for submitting API calls in accordance with a protocol utilized by a service provider, including REST, SOAP, and the like.

Generated programmatic implementation data is sent 532 to the user device 501. As discussed, such programmatic implementation data can comprise one or more excerpts of code, program text, program template and/or an executable program corresponding to a portion of the recorded actions. In various examples, a program template can comprise program code with placeholder values that can be populated for the code to work. The values can be, for example, identifiers of resources, identities, and the like. In one example, an identifier of a data object can be defined in a set of recorded API calls, and a program template based on the set of API calls can include a blank or other insertion position for an identifier of a data object to be inserted by a user based on which data object the user desires to reference.

In some examples, the graphical management service 502 may or may not be the same graphical management service 150, 350, 406 of FIGS. 1, 3, and/or 4. In some examples, the user device 501 may or may not be the same user device 150, 310 of FIGS. 1 and/or 3.

Figure 6:
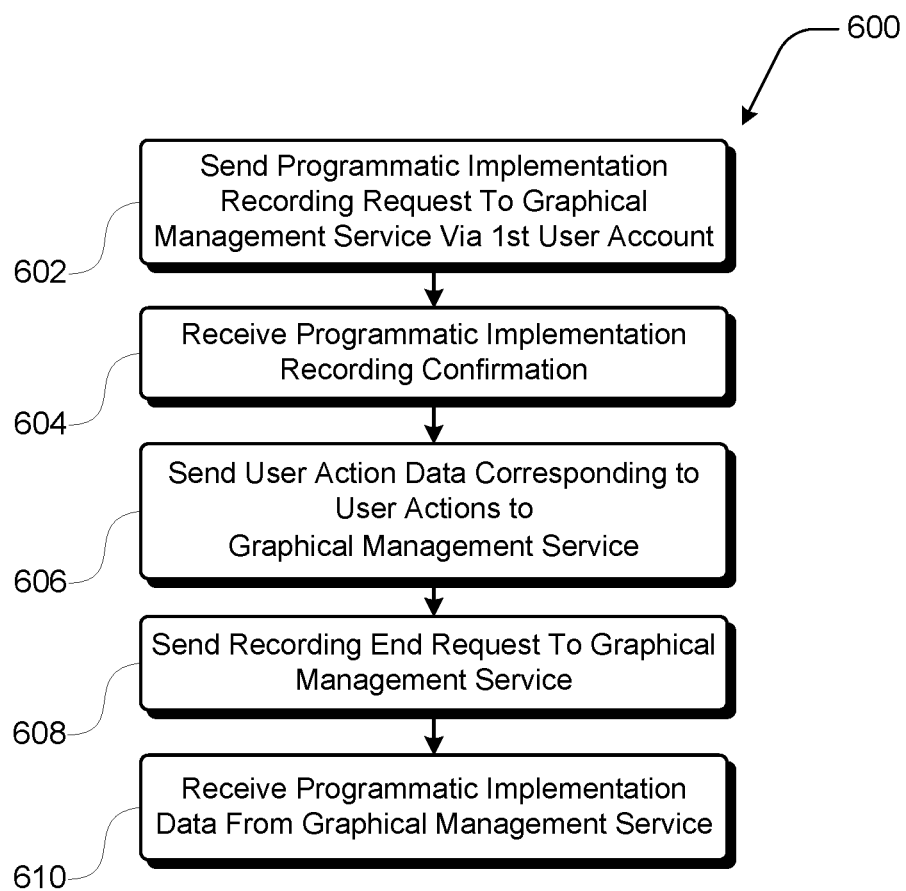
FIG. 6 is a block diagram illustrating an example method for recording user actions and generating programmatic implementation data at a user device.

FIG. 6 is a block diagram illustrating an example method 600 for recording user actions and generating programmatic implementation data at a user device, which may or may not be the same user device 150, 310 of FIGS. 1 and/or 3. In various examples, the following portions of the method 600 can be performed by a user interacting with a user device, but in further examples, the method 600 can be performed by any suitable device, program, or the like.

The method 600 begins with the user device sending 602 a programmatic implementation recording request to a graphical management service via a first user account and receiving 504 a programmatic implementation recording confirmation. For example, a user can click a record button in a user interface presented on the user device or otherwise initiate a recording session and receive a graphical or other suitable confirmation that the recording session has been initiated.

User action data corresponding to user actions performed at the user device are sent 606 to the graphical management service. For example, a user can perform various action on a user interface, including clicking on a tab, clicking a button, checking boxes, inputting a setting, selecting a radio-button, or the like, which can correspond to or be associated with various actions or API calls and/or the setting of parameters for API calls. Such actions or API calls can be sent to the graphical management service in various suitable forms including a representational state transfer (REST), or simple object access protocol (SOAP) communication.

A recording end request is sent 608 to the graphical management service and programmatic implementation data is received 610 from the graphical management service. For example, the various actions that a user desires to automate can be performed during an action recording session, and the session can then be terminated. A portion of the recorded actions can be used to generate a programmatic implementation, which can be received at the user device. As discussed, such a programmatic implementation can comprise an excerpt of code, program text, template, and/or an executable program that correspond to a portion of the recorded actions during the session.

Figure 7:
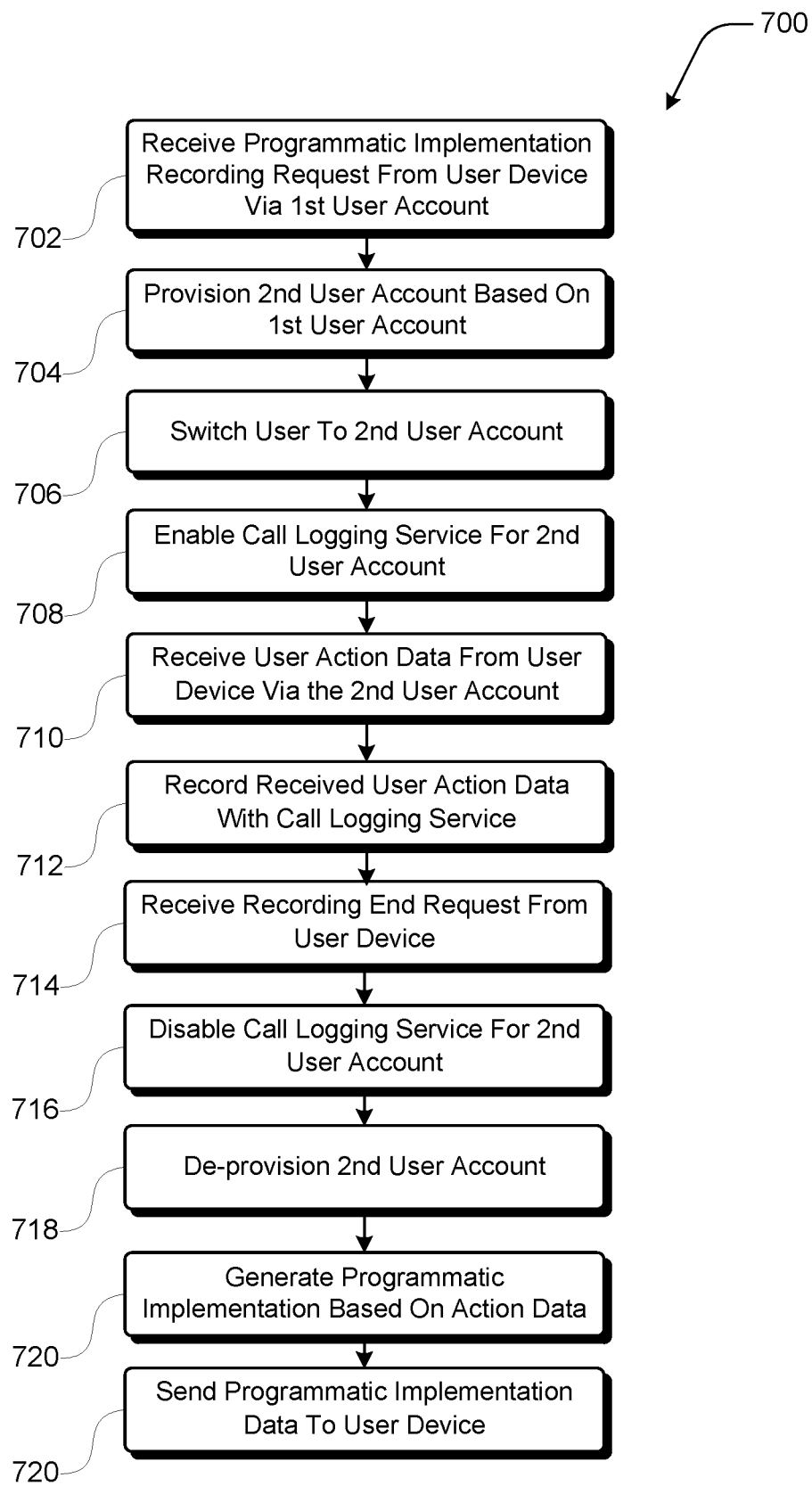
FIG. 7 is a block diagram illustrating an example method for recording user actions and generating programmatic implementation data at a graphical management service.

FIG. 7 is a block diagram illustrating an example method 700 for recording user actions and generating programmatic implementation data at a graphical management service, which may or may not be the same graphical management service 150, 350, 406 of FIGS. 1, 3, and/or 4. While this example, relates to communications relative to a graphical management service, in further examples any suitable device or program can perform a portion of the method 700 described below.

The method 700 begins where a programmatic implementation recording request is received 702 graphical management service from a user device via a first user account. The graphical management service can provision 704 a second user account based on the first user account and switch 706 the user from the first user account to the second user account and enable 708 a call logging service for the second user account.

For example, as discussed, initiating a user action recording session can include provisioning 704 by the graphical management service a new and clean second user account that has fewer or the same permissions as the first user account, and can include the graphical management service switching 706 the user to the second user account. Using a second user can provide for cleaner recording of actions during the recording session because the new second user account can be provisioned to have fewer background actions or be prevented from generating extraneous actions based on selected permissions, account settings or the like. Such provisioning 704 and switching 706 to the second user account performed by the graphical management service can be obscured from the user and user device.

User action data can be received 710 from the user device via the second user account and recorded 712 by the call logging service. A recording end request is received 714 and the graphical management service disables 716 the call logging service for the second user account and de-provisions 718 the second user account. A programmatic implementation is generated 720 based on the recorded user action data during the recording session and programmatic implementation data is sent 722 to the user device.

Figure 8:
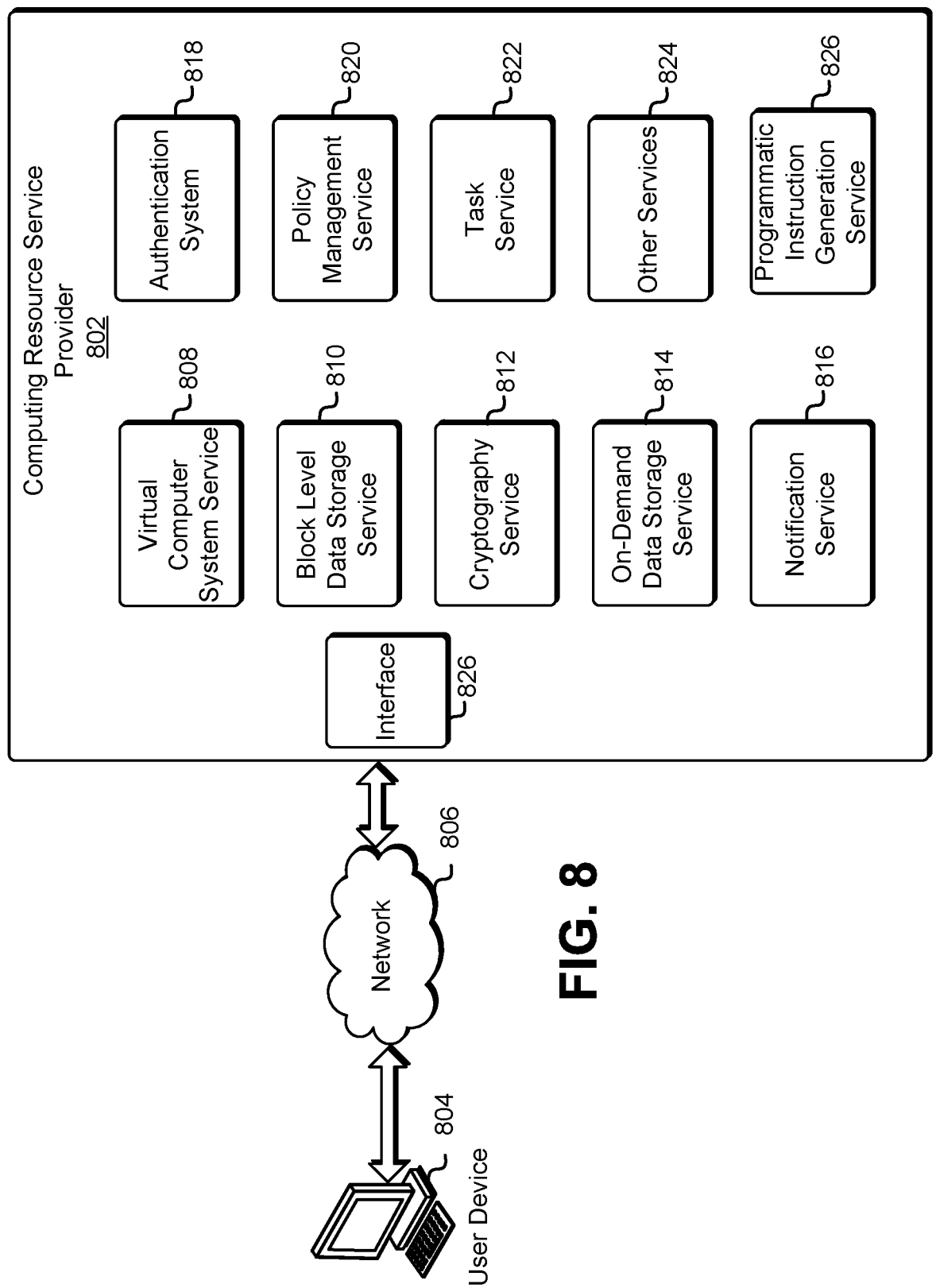
FIG. 8 illustrates an example operating environment having a computing resource service provider configured to provide a user device access to a plurality of computing resources via a network.

FIG. 8 shows an example of a customer connected to a computing resource service provider in accordance with at least one example. The computing resource service provider 802 may provide a variety of services to the customer 804 and the customer 804 may communicate with the computing resource service provider 802 via an interface 826, which may be a web services interface or any other type of customer interface. While FIG. 8 shows one interface 826 for the services of the computing resource service provider 802, each service may have its own interface and, generally, subsets of the services may have corresponding interfaces in addition to or as an alternative to the interface 826. The customer 804 may be an organization that may utilize one or more of the services provided by the computing resource service provider 802 to maintain and deliver information to its employees, which may be located in various geographical locations. Additionally, the customer 804 may be an individual that utilizes the services of the computing resource service provider 802 to deliver content to a working group located remotely. As shown in FIG. 8, the customer 804 may communicate with the computing resource service provider 802 through a network 806, whereby the network 806 may be a communication network, such as the Internet, an intranet or an Internet service provider (ISP) network. Some communications from the customer 804 to the computing resource service provider 802 may cause the computing resource service provider 802 to operate in accordance with one or more example described herein or a variation thereof.

The computing resource service provider 802 may provide various computing resource services to its customers. The services provided by the computing resource service provider 802, in this example, include a virtual computer system service 808, a block-level data storage service 810, a cryptography service 812, an on-demand data storage service 814, a notification service 816, an authentication system 818, a policy management service 820, a task service 822 and one or more other services 824. It is noted that not all examples described herein include the services 808-824 described with reference to FIG. 8 and additional services may be provided in addition to or as an alternative to services explicitly described herein. As described herein, each of the services 808-824 may include one or more web service interfaces that enable the customer 804 to submit appropriately configured API calls to the various services through web service requests. In addition, each of the services may include one or more service interfaces that enable the services to access each other (e.g., to enable a virtual computer system of the virtual computer system service 808 to store data in or retrieve data from the on-demand data storage service 814 and/or to access one or more block-level data storage devices provided by the block level data storage service 810).

The virtual computer system service 808 may be a collection of computing resources configured to instantiate virtual machine instances on behalf of the customer 804. The customer 804 may interact with the virtual computer system service 808 (via appropriately configured and authenticated API calls) to provision and operate virtual computer systems that are instantiated on physical computing devices hosted and operated by the computing resource service provider 802. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 808 is shown in FIG. 8, any other computer system or computer system service may be utilized in the computing resource service provider 802, such as a computer system or computer system service that does not employ virtualization or instantiation and instead provisions computing resources on dedicated or shared computers/servers and/or other physical devices.

The block-level data storage service 810 may comprise one or more computing resources that collectively operate to store data for a customer 804 using block-level storage devices (and/or virtualizations thereof). The block-level storage devices of the block-level data storage service 810 may, for instance, be operationally attached to virtual computer systems provided by the virtual computer system service 808 to serve as logical units (e.g., virtual drives) for the computer systems. A block-level storage device may enable the persistent storage of data used/generated by a corresponding virtual computer system where the virtual computer system service 808 may only provide ephemeral data storage.

The computing resource service provider 802 also includes a cryptography service 812. The cryptography service 812 may utilize one or more storage services of the computing resource service provider 802 to store keys of the customers in encrypted form, whereby the keys may be usable to decrypt customer 812 keys accessible only to particular devices of the cryptography service 812.

The computing resource service provider 802 further includes an on-demand data storage service 814. The on-demand data storage service 814 may be a collection of computing resources configured to synchronously process requests to store and/or access data. The on-demand data storage service 814 may operate using computing resources (e.g., databases) that enable the on-demand data storage service 814 to locate and retrieve data quickly, so as to allow data to be provided in responses to requests for the data. For example, the on-demand data storage service 814 may maintain stored data in a manner such that, when a request for a data object is retrieved, the data object can be provided (or streaming of the data object can be initiated) in a response to the request. As noted, data stored in the on-demand data storage service 814 may be organized into data objects. The data objects may have arbitrary sizes except, perhaps, for certain constraints on size. Thus, the on-demand data storage service 814 may store numerous data objects of varying sizes. The on-demand data storage service 814 may operate as a key value store that associates data objects with identifiers of the data objects that may be used by the customer 804 to retrieve or perform other operations in connection with the data objects stored by the on-demand data storage service 814.

In the environment illustrated in FIG. 8, a notification service 816 is included. The notification service 816 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 816 may provide notifications to clients using a "push" mechanism without the need to check periodically check or "poll" for new information and updates. The notification service 816 may further be used for various purposes such as monitoring applications executing in the virtual computer system service 808, workflow systems, time-sensitive information updates, mobile applications, and many others.

As illustrated in FIG. 8, the computing resource service provider 802, in various examples, includes an authentication system 818 and a policy management service 820. The authentication system 818, in an example, is a computer system (i.e., collection of computing resources) configured to perform operations involved in authentication of users of the customer. For instance, one of the services 808-816 and 820-826 may provide information from a user to the authentication service system 818 to receive information in return that indicates whether or not whether the user requests are authentic.

The policy management service 820, in an example, is a computer system configured to manage policies on behalf of customers (such as customer 804) of the computing resource service provider 802. The policy management service 820 may include an interface that enables customers to submit requests related to the management of policy. Such requests may, for instance, be requests to add, delete, change, or otherwise modify policy for a customer or for other administrative actions, such as providing an inventory of existing policies and the like.

The computing resource service provider 802, in various examples, is also equipped with a task service 822. The task service 822 is configured to receive a task package from the customer 804 and enable executing tasks as dictated by the task package. The task service 822 may be configured to use any resource of the computing resource service provider 802, such as one or more instantiated virtual machines or virtual hosts, for executing the task. The task service 824 may configure the one or more instantiated virtual machines or virtual hosts to operate using a selected operating system and/or a selected execution application in accordance with a requirement of the customer 804.

The computing resource service provider 802 additionally maintains one or more other services 824 based at least in part on the needs of its customers 804. For instance, the computing resource service provider 802 may maintain a database service for its customers 804. A database service may be a collection of computing resources that collectively operate to run one or more databases for one or more customers 804. The customer 804 may operate and manage a database from the database service by utilizing appropriately configured API calls. This, in turn, may allow a customer 804 to maintain and potentially scale the operations in the database. Other services include, but are not limited to, object-level archival data storage services, services that manage and/or monitor other services.

The programmatic instruction service programmatic instruction generation service 826 may include those services described above or some or all may be separately part of the service provider system 802. For example, in some examples, the programmatic instruction generation service 826 can comprise a graphical management service, a call logging service and/or a program generator as discussed above.

Figure 9:
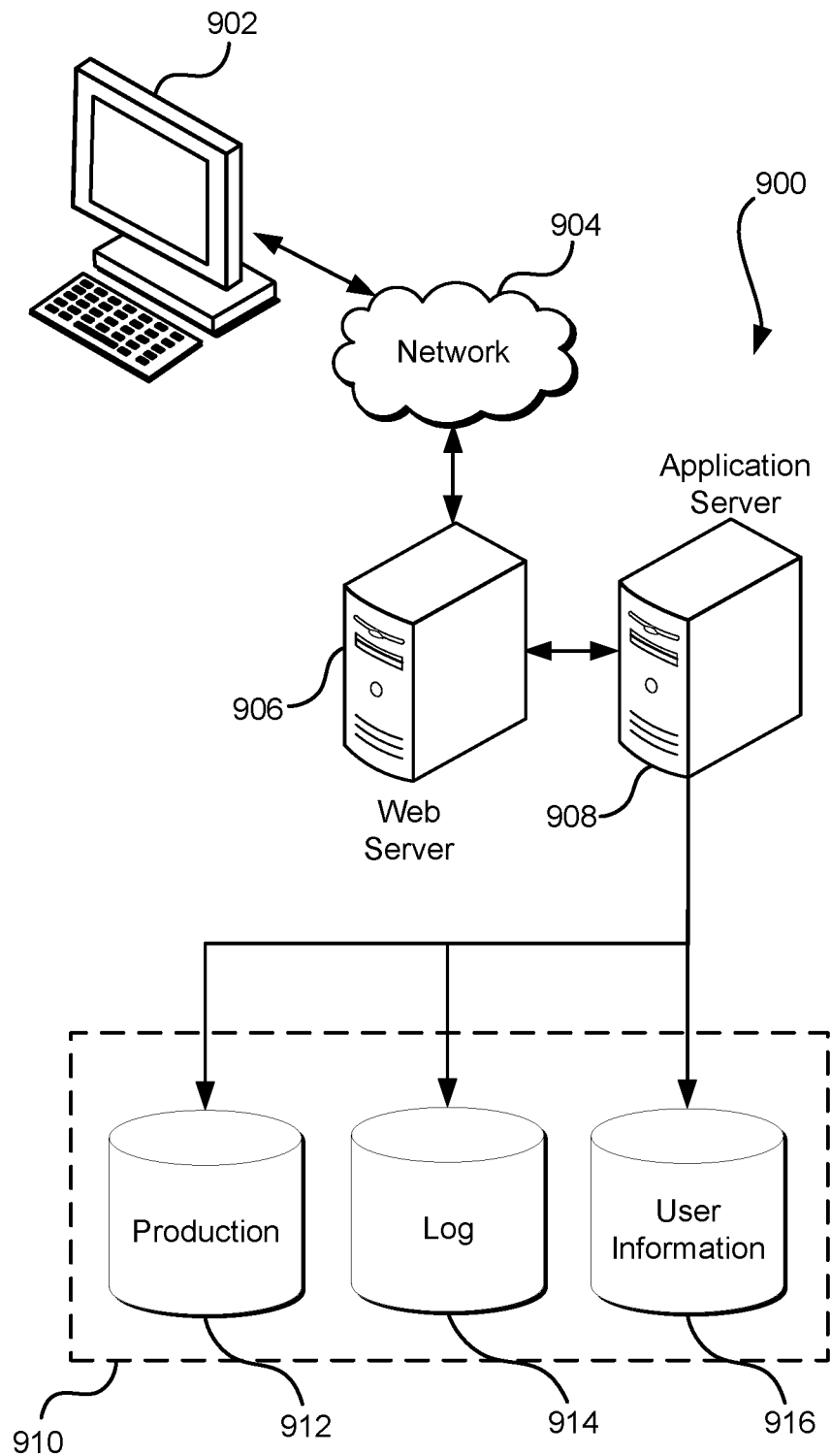
FIG. 9 illustrates an environment in which various example actions or methods of the present disclosure can be implemented.

FIG. 9 illustrates aspects of an example environment 900 for implementing aspects in accordance with various examples. As will be appreciated, although a web-based environment is used for purposes of explanation, different environments may be used, as appropriate, to implement various examples. The environment includes an electronic client device 902, which can include any appropriate device operable to send and/or receive requests, messages, or information over an appropriate network 904 and, in some examples, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that examples of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one example, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various examples further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various examples of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some examples, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In examples utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain examples require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some examples, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various examples of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate examples of the invention and does not pose a limitation on the scope of the invention unless otherwise claimed. No language in the specification should be construed as indicating any non-claimed element as essential to the practice of the invention.

Examples of this disclosure are described herein, including the best mode known to the inventors for carrying out the invention. Variations of those examples may become apparent to those of ordinary skill in the art upon reading the foregoing description. The inventors expect skilled artisans to employ such variations as appropriate and the inventors intend for examples of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining from a user device, a request to initiate an action recording session, the request associated with a first user account;
   provisioning a second user account based at least in part on the first user account;
   causing a first set of API calls made as a result of user interaction with a graphical user interface associated with the first user account presented at the user device to be made on behalf of the second account; and
   generating a programmatic implementation, based at least in part on a portion of a first recorded set of API calls recorded during the action recording session, that includes executable instructions to submit a second set of API calls to perform a set of actions to manage configurations for a plurality of computing resources.

2. The computer-implemented method of claim 1, wherein the first set of API calls made as a result of user interaction with the graphical user interface presented at the user device correspond to actions performed at the user device related to computing resources associated with the first user account.

3. The computer-implemented method of claim 1, wherein the programmatic implementation comprises at least one of a program template, program text, or an executable program to be inserted into another program to perform at least a portion of the first recorded set of API calls recorded during the action recording session.

4. The computer-implemented method of claim 1, further comprising de-provisioning the second user account in response to a request to terminate the action recording session.

5. The computer-implemented method of claim 1, wherein the programmatic implementation comprises filtered information from the action recording session based at least in part on a filtering criteria, wherein the filtered information excludes query API calls or includes mutating API calls.

6. A system, comprising:
one or more processors; and
memory that includes instructions that, as a result of being executed by the one or more processors, cause the system to at least:
provide a set of permissions to a second user account that enables a first set of API calls to be made in connection with resources associated with a first user account;
initiate an action recording session during which interaction with an interface on behalf of the first user account results in a second set of API calls being made on behalf of a second user account;
generate a programmatic implementation based at least in part on a third set of API calls made on behalf of the second user account by the resources associated with the first user account during the action recording session; and
cause the programmatic implementation to be executed to configure the resources associated with the first user account.

7. The system of claim 6, wherein the instructions, as a result of being executed by the one or more processors, further cause the system to record, during the action recording session, the second set of API calls made on behalf of the second user account.

8. The system of claim 6, wherein the second user account has a proper subset of account permissions held by the first user account.

9. The system of claim 6, wherein the interface indicates that the second set of API calls are being made on behalf of the first user account while the second set of API calls are being made on behalf of the second user account during the action recording session.

10. The system of claim 6, wherein the programmatic implementation includes source code that, when executed by the one or more processors, causes a fourth set of API calls to manage computing resources to be submitted to a set of computing resources, the fourth set of API calls to manage computing resources corresponding at least to a portion of a first recorded set of API calls made during the action recording session.

11. The system of claim 6, wherein generating the programmatic implementation comprises identifying a portion of the second set of API calls that should be excluded from the programmatic implementation based on an exclusion list.

12. The system of claim 6, wherein, in response to a termination of the action recording session, the instructions, as a result of being executed by the one or more processors, further cause the system to interact with the interface on behalf of the first user account to result in API calls being made on behalf of the first user account and ceases API calls being made on behalf of the second user account.

13. The system of claim 6, wherein the instructions, as a result of being executed by the one or more processors, further cause the system to de-provision the second user account in response to a termination of the action recording session.

14. A non-transitory computer-readable storage medium comprising stored thereon executable instructions that, as a result of being executed by one or more processors of a computer system, cause the computer system to at least:
initiate an action recording session during which interaction with an interface on behalf of a first user account results in a first set of API calls being made on behalf of a second user account in accordance with a set of permissions provided to the second user account for the action recording session;
generate a programmatic implementation based at least in part on a second set of API calls made on behalf of the second user account by computing resources associated with the first user account during the action recording session; and
make the programmatic implementation available for the submission of a third set of API calls relating to the computing resources, wherein the programmatic implementation includes information to modify the computing resources.

15. The non-transitory computer-readable storage medium of claim 14, wherein the instructions further comprise instructions that, as a result of being executed by the one or more processors, cause the computer system to de-provision the second user account in response to a termination of the action recording session.

16. The non-transitory computer-readable storage medium of claim 14, wherein the instructions further comprise instructions that, as a result of being executed by the one or more processors, cause the computer system to obtain an API call log from a call logging service, the API call log comprising at least a portion of the second set of API calls made on behalf of the second user account by the computing resources associated with the first user account during the action recording session.

17. The non-transitory computer-readable storage medium of claim 14, wherein the instructions further comprise instructions that, as a result of being executed by the one or more processors, cause the computer system to record the first set of API calls made as a result of user interaction with the interface that correspond to actions performed related to the computing resources associated with the first user account.

18. The non-transitory computer-readable storage medium of claim 14, wherein the instructions that cause the computer system to generate the programmatic implementation further include instructions that cause the computer system to generate the programmatic implementation to comprise one of a program template, program text, or an executable program.

19. The non-transitory computer-readable storage medium of claim 14, wherein the instructions further comprise instructions that, as a result of being executed by the one or more processors, cause the computer system to present the interface including an indication of the first user account, but lacks an indication of the second user account.

20. The non-transitory computer-readable storage medium of claim 14, wherein the instructions further comprise instructions that, as a result of being executed by the one or more processors, cause the computer system to temporarily generate the second user account for an action recording session, the second temporary user account to be associated with a proper subset of account permissions held by the first user account.

21. The non-transitory computer-readable storage medium of claim 14, wherein the instructions further comprise instructions that, as a result of being executed by the one or more processors, cause the computer system to cause API calls made as a result of user interaction with the interface presented at a user device to be made on behalf of the second user account temporarily during an action recording session and to cause API calls made as a result of user interaction with the interface presented at a user device to be made on behalf of a first user account in response to a termination of the action recording session.

* * * * *